(12) United States Patent
Yamazoe

(10) Patent No.: US 9,230,155 B2
(45) Date of Patent: Jan. 5, 2016

(54) EXTRACTION OF KEYFRAMES AT REGULAR INTERVALS BY FINDING NEARBY HIGH-QUALITY FRAMES

(75) Inventor: Manabu Yamazoe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 584 days.

(21) Appl. No.: 13/551,285

(22) Filed: Jul. 17, 2012

(65) Prior Publication Data

US 2013/0022273 A1  Jan. 24, 2013

(30) Foreign Application Priority Data

Jul. 23, 2011  (JP) ................................. 2011-161437

(51) Int. Cl.
*G06K 9/00* (2006.01)
*G06K 9/03* (2006.01)

(52) U.S. Cl.
CPC ........ *G06K 9/00228* (2013.01); *G06K 9/00751* (2013.01); *G06K 9/036* (2013.01)

(58) Field of Classification Search
None
See application file for complete search history.

(56) References Cited

U.S. PATENT DOCUMENTS

| 5,404,316 | A  | * | 4/1995 | Klingler et al. | ............... | 715/723 |
| 2002/0075269 | A1 | * | 6/2002 | Dutta et al. | ................... | 345/473 |
| 2003/0095785 | A1 | * | 5/2003 | Izumi | ............................... | 386/46 |
| 2007/0003222 | A1 | * | 1/2007 | Shingai | ........................... | 386/95 |
| 2011/0292288 | A1 | * | 12/2011 | Deever | .......................... | 348/590 |

FOREIGN PATENT DOCUMENTS

| JP | 4301236 B2 | 7/2009 |
| JP | 2011-019142 A | 1/2011 |

* cited by examiner

*Primary Examiner* — Barry Drennan
(74) *Attorney, Agent, or Firm* — Canon U.S.A., Inc. IP Division

(57) ABSTRACT

An image processing apparatus according to the present invention can specify, among a plurality of frames, a plurality of frame groups having at least one frame included between the plurality of frame groups that are extraction target candidates in an array of the plurality of frames in the moving image according to a predetermined frame interval, analyze each of the plurality of specified frame groups, and extract a frame to be output from each of the plurality of frame groups based on a result of the analysis.

25 Claims, 7 Drawing Sheets

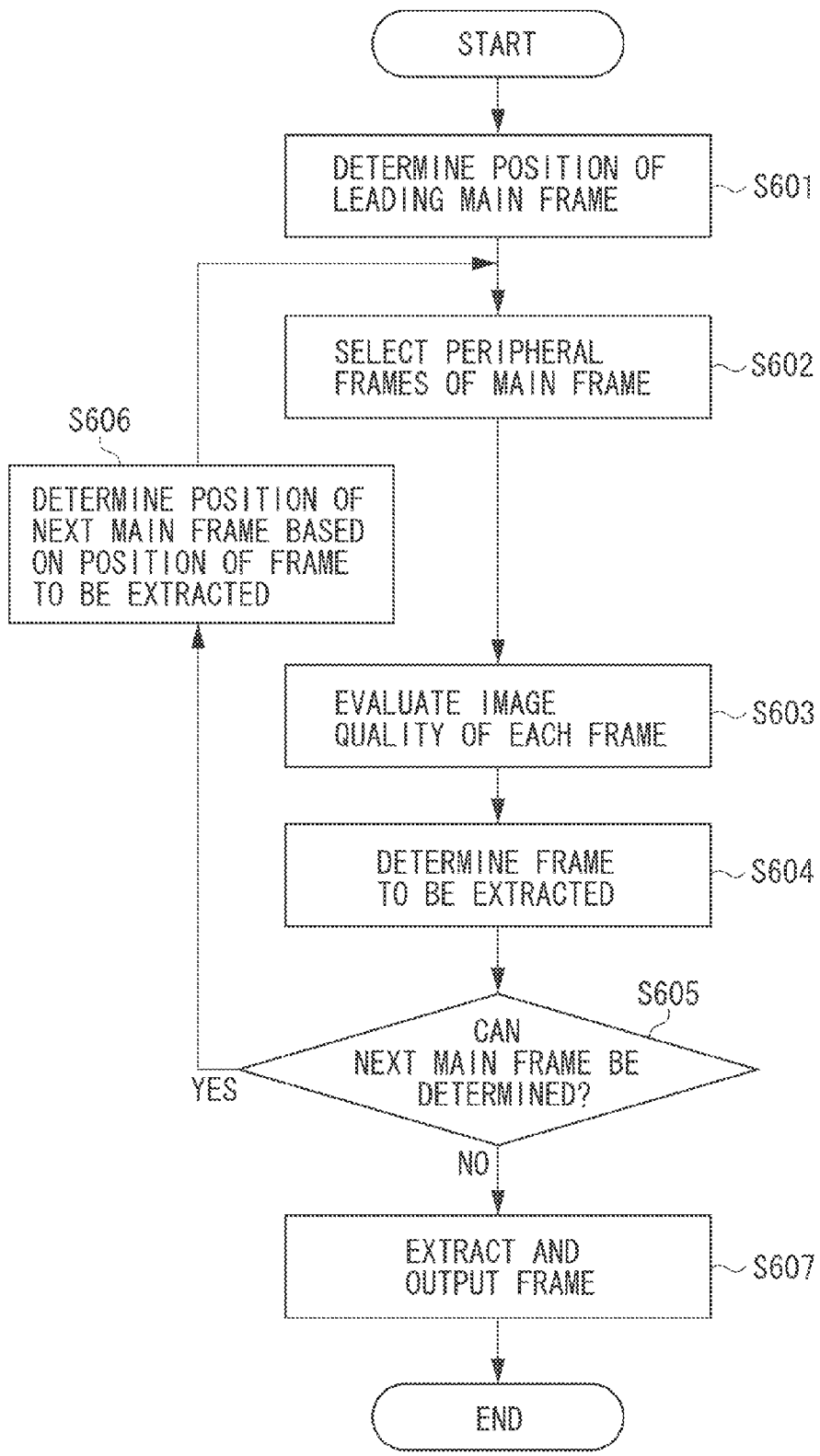

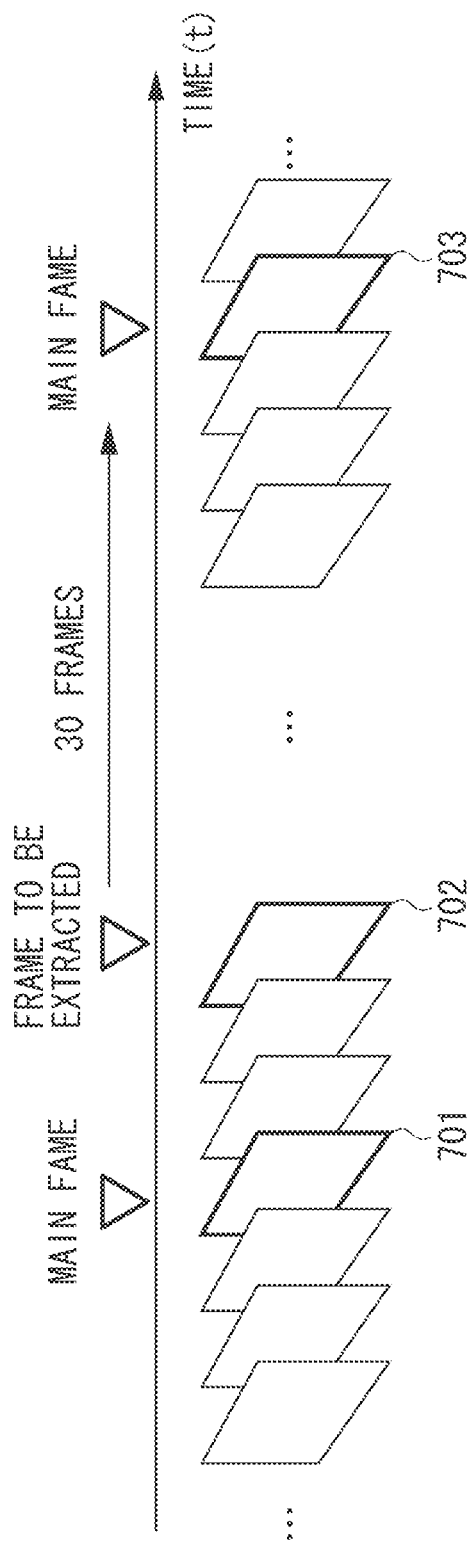

EXTRACTION OF KEYFRAMES AT REGULAR INTERVALS BY FINDING NEARBY HIGH-QUALITY FRAMES

BACKGROUND OF THE INVENTION

1. Field of the Invention

The present invention relates to an image processing apparatus for outputting a frame to be output, which is extracted from a moving image including a plurality of frames, an image processing method, and a storage medium.

2. Description of the Related Art

Conventionally, concerning apparatuses having moving image reproduction functions, there is an apparatus that has a function of extracting a still image constituting a moving image from the moving image. With the function of this type, when a user designates a frame to be extracted from a plurality of frames included in the moving image, an image of the designated frame can be outputted to a display device such as a liquid crystal monitor to be displayed. In addition, by outputting the frame extracted from the moving image to a printing apparatus, an image corresponding to the frame can be printed on printing paper.

Among the still images included in the moving image, a still image captured when a photographer's hand or an object moves may not be an appropriate output target because of shaking. Thus, Japanese Patent No. 4301236 discusses a technique for analyzing moving image data to acquire a shaking amount of each frame included in the moving image, determining a reference frame based on the acquired shaking amount, and outputting peripheral frames within a predetermined range of the reference frame.

According to this conventional technique, frames low in shaking are handle as output targets. Accordingly, when a plurality of frames are extracted as the output targets, since an interval between the frames with less shaking depends on a content of the moving image, intervals among the plurality of frames of the output targets may vary from one moving image to another.

As a result, even when the user confirms contents of the plurality of frames extracted by the conventional technique, it may be difficult for the user to understand time intervals which the plurality of frames to be output correspond to. In such a case, the user may not be able to understand how objects or scenes included in the plurality of frames have changed in the moving image.

SUMMARY OF THE INVENTION

The present invention is directed to an image processing apparatus capable of extracting a plurality of frames appropriate as output targets from a moving image at intervals instructed by a user, an image processing method, and a program.

According to an aspect of the present invention, an image processing apparatus for extracting a frame to be output among a plurality of frames constituting a moving image includes a specification unit configured to specify, among the plurality of frames, a plurality of frame groups having at least one frame included between the plurality of frame groups that are extraction target candidates in an array of the plurality of frames in the moving image according to a predetermined frame interval, and an extraction unit configured to analyze each of the plurality of frame groups specified by the specification unit and extract a frame to be output from each of the plurality of frame groups based on a result of the analysis.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 is a flowchart illustrating frame extraction processing.

FIG. 7 illustrates main frame determination processing.

DESCRIPTION OF THE EMBODIMENTS

Various exemplary embodiments, features, and aspects of the invention will be described in detail below with reference to the drawings.

Figure 1:
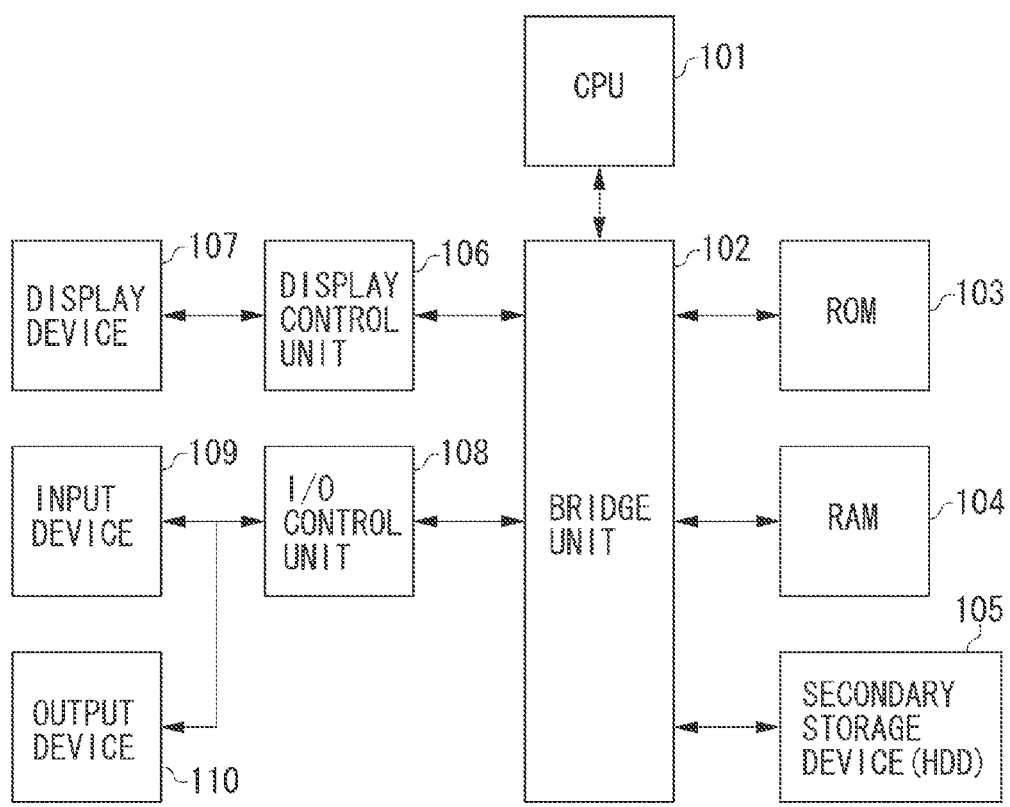
FIG. 1 is a block diagram illustrating an image processing apparatus.

FIG. 1 is a block diagram illustrating an image processing apparatus according to an exemplary embodiment.

A central processing unit (CPU) 101 controls other functional blocks or apparatuses. A bridge unit 102 provides a function of controlling data transfer between the CPU 101 and the other functional blocks.

A read only memory (ROM) 103 is a nonvolatile read-only memory and stores a program referred to as a Basic Input/Output System (BIOS). The BIOS, which is a program first executed when the image processing apparatus is activated, controls a basic input/output function of a peripheral device, such as a secondary storage device 105, a display device 107, an input device 109, and an output device 110.

A random access memory (RAM) 104 provides a high-speed readable/writable storage area.

The secondary storage device 105 is a hard disk drive (HDD) that provides a large-capacity storage area. When the BIOS is executed, an operating system (OS) stored in the HDD is executed. The OS can provide a basic function, application management, and a basic graphical user interface (GUI) usable in all applications. The application can provide a UI for realizing application's own function in combination with the GUI provided from the OS.

The OS, an execution program of the other applications, and data used for work are stored in the ROM 103 or the secondary storage device 105 when necessary. An image processing application to achieve the present invention is stored in the ROM 103 or the secondary storage device 105, and provided as an application activated by a user's operation. Processing described below is achieved by executing, via the CPU 101, the program such as the OS or the image processing application stored in the ROM 103 or the secondary storage device 105 using the RAM 104 as a work memory.

A display control unit 106 executes control to generate a result of the user's operation to the OS or the application as image data of the GUI, and display the image data on the display device 107. For the display device 107, a liquid crystal display or a cathode ray tube (CRT) display can be used.

An Input/Output (I/O) control unit 108 provides an interface with a plurality of devices, namely, the input device 109 and the output device 110. Representative interfaces are a Universal Serial Bus (USB) and a Personal System/2 (PS/2).

The input device 109 is an operation device such as a keyboard or a mouse, and the I/O control unit 108 inputs a user's instruction to the image processing apparatus via the input device 109.

The I/O control unit 108 is connected to the output device 110 to output various pieces of data thereto. The output device 110 is, for example, a printer. The I/O control unit outputs print data to the output device to enable printing of an image corresponding to the print data.

A digital camera and a storage device, such as a USB memory, a Compact Flash (CF) memory, or a Secure Digital (SD) memory card, can be connected to the image processing apparatus. Further, the I/O control unit can transfer image data such as image data to the digital camera or the memory, or conversely acquire data from the digital camera or the memory.

As described below, according to the present exemplary embodiment, a frame is extracted from a moving image including a plurality of frames. Data of the moving image is supplied from the secondary storage device 105 or the USB memory, the CF memory, or the SD memory card connected to the image processing apparatus.

Figure 2:
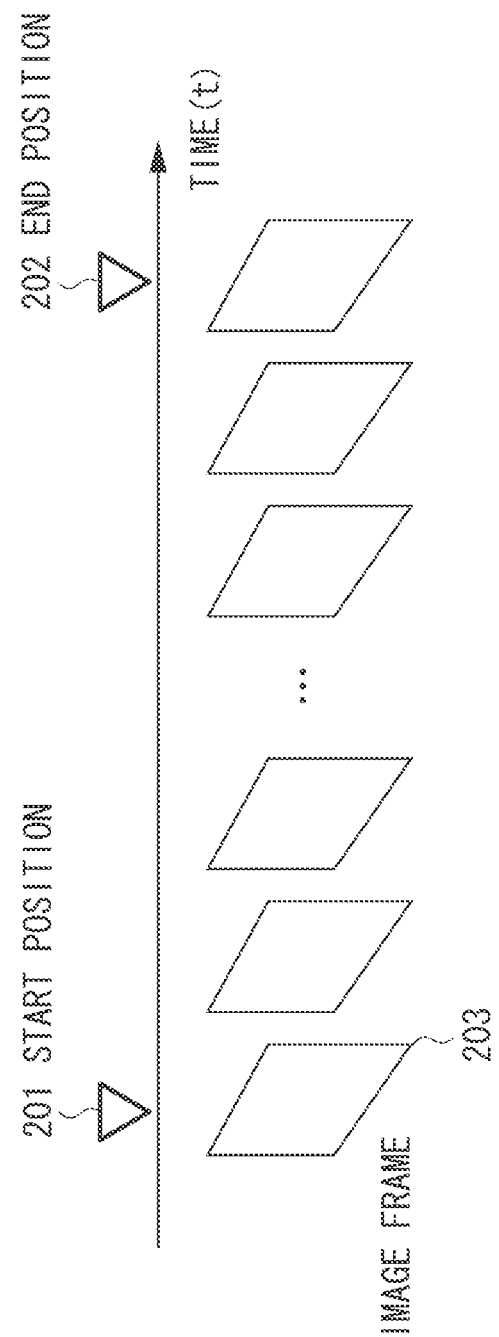
FIG. 2 illustrates frames constituting a moving image.

FIG. 2 illustrates the frames constituting the moving image. General moving image data includes 30 to 60 frames per second (number of frames per second is represented by frame per sec: fps). For example, 3-minute moving image data of 30 fps includes 5400 frames, namely, 30×180=5400.

In the present exemplary embodiment, according to frame intervals determined by a user's instruction, appropriate frames low in shaking or blurring are extracted so that the frames to be extracted (i.e., extraction target frames) can achieve the frame intervals.

To extract a still image from the moving image data, the user can designate a start position 201 and an end position 202 using the input device 109 as illustrated in FIG. 2. In the moving image, frames between the start position 201 and the end position 202 are determined as frame candidates of the extraction target frames. If the user does not designate any start position 201 or end position 202, a leading frame and a last frame of the moving image file can respectively be set as a start position and an end position.

The user inputs by the input device the number of still images to be cut out from the moving image that is designated by the user. Then, the image processing apparatus specifies the number of frames instructed by the user. For example, when the user designates 20 frames, the image processing apparatus specifies 20 frames at predetermined intervals among a plurality of frames 203 from the start position 201 to the end position 202. Such specified frames are referred to as main frames or reference frames.

The image processing apparatus then extracts frames low in shaking or blurring as output targets from a frame group including the main frames and peripheral frames around the main frames. In other words, a group of frames to be output target candidates is specified based on positions of the main frames in the moving image, and the frames to be output are extracted from the frame group. The main frames and the peripheral frames are described below referring to FIG. 3.

As a moving image format, there are a progressive format and an interlaced format. In the case of the progressive format, when a frame is cut out to be displayed, all pixels constituting a still image are displayed at the same timing. On the other hand, in the case of the interlaced format, an odd-line pixel and an even-line pixel of one frame are displayed with a time lag. To cut out still images from an image of the interlaced format, the CPU 101 acquires still images having no time lag by executing image processing, namely interlace releasing.

Further, for example, in a moving image format such as Moving Picture Experts Group (MPEG), data is compressed by detecting inter-frame motion of an object included in the frame (motion detection). To determine shaking or blurring of a plurality of frames, decompression processing is executed for the compressed data sequentially for the respective frames, and shaking or blurring analysis processing is executed for the frames completed for decompression.

In such a moving image format, compression processing is executed by the motion detection. However, for each predetermined number of frames, a frame subjected to compression without any motion detection is set. In other words, the data is compressed by employing a still image compression method for the frame. Normally, image quality is higher in the frame of no motion detection than the frame subjected to compression by motion detection in many cases. Thus, when the output target frames are extracted, frames subjected to compression without any motion detection can preferentially be extracted.

Figure 3:
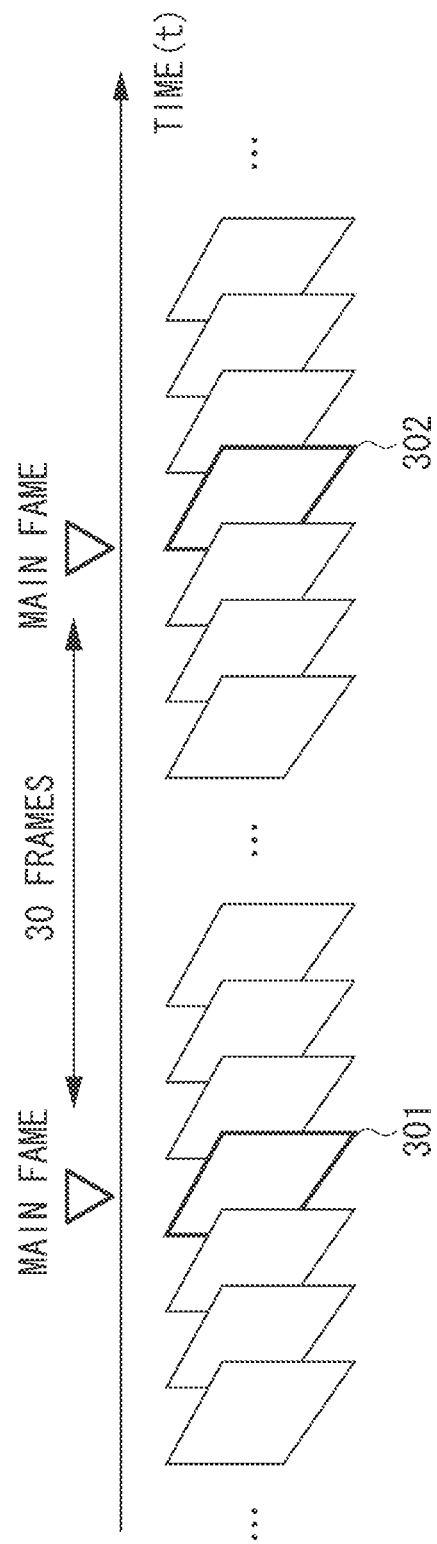
FIG. 3 illustrates main frames in the moving image.

FIG. 3 illustrates the main frames in the moving image. More specifically, FIG. 3 schematically illustrates the main frames 301 and 302 which are specified in the sequence of the moving image illustrated in FIG. 2, and the plurality of frames around the main frames.

A predetermined number of peripheral frames is set in a backward direction in time or a forward direction in time from the main frame in the moving image, or both directions. Then, the extraction target frames are determined from a frame group including the main frame and the peripheral frames.

When the main frames are specified as described above, a leading main frame and a trailing edge main frame are respectively specified according to the start position 201 and the end position 202. These leading edge and trailing edge main frames are frames located in, for example, the start position 201 and the end position 202.

The number of main frames is designated by the user, and thus an interval between the main frames is determined according to user's designation of the start position 201, the end position 202, and the number of extraction target frames. In other words, for example, when the number of extraction target frames is set small, and the start position 201 and the end position 202 are widely spaced from each other, an interval between the main frames becomes large. In the example illustrated in FIG. 3, the interval between the main frames is represented by 30 frames.

However, in the case of the method for designating the number of the extraction target frames by the user, it may be difficult for an unaccustomed user to set an interval between the main frames to be a desired frame interval (30 frames).

Thus, it can be configured to enable the user to specify not the number of the extraction target frames (or main frames) but a frame interval. As a method for specifying the frame interval, the user can specify the number of frames between the main frames, and the specified number of frames can be input. Alternatively, a time interval in a moving image specified by the user can be input, and the number of frames corresponding to the time interval can be determined as the number of frames between the main frames.

The peripheral frames are not necessarily frames continuous from the main frames. A plurality of peripheral frames can be set skipping at predetermined intervals. However, since in blur detection in a frame described below, processing loads of the image processing apparatus increase as the number of frames to be analyzed is larger, thus efficient setting to the number of frames is important. In other words, if the possibility that there may be at least one appropriate frame in the plurality of frames to be analyzed can be increased, the appropriate frame can be efficiently extracted while suppressing the processing loads.

In addition, the number of peripheral frames can be determined according to characteristics of the moving image. For example, a moving image that a user has captured by a digital camera is described. When the user captures images with holding the camera by hand, the user cannot completely secure the camera. A main shaking cause is probably motion of the user during the image-capturing, and shaking occurs according to an interval between steps.

When the inventor conducted an experiment with subjects, results revealed that an average walking pace is 0.5 to 0.6 seconds per step, and vertical motions made by walking is regarded as vibration, speeds of up-and-down motion become zero at upper and lower peaks. In other words, focusing on frames in 0.3 seconds, at least one frame can be expected to be included in the captured frames as a frame where camera motion is fixed in the shaking generated during the image-capturing. Accordingly, when the number of frames corresponding to 0.3 seconds is set as detection target for shaking of the peripheral frames, one frame low in shaking can be expected to be extracted from the plurality of frames.

The main frames thus determined and the peripheral frames corresponding to the main frames become frame candidates to be extracted as frames low in shaking or blurring. Then, image qualities of the images of the main frames and the peripheral frames are evaluated, and a frame, which can is considered best as a still image to be extracted, is extracted. As an image quality evaluation method, especially by estimating the amounts of shaking or blurring included in the images, a frame low in shaking or blurring can be determined as a still image to be extracted.

As the image quality evaluation method, when a main object can be specified by detecting a face for each frame, blurring can be analyzed around the area of the detected face, and a frame to be extracted can be determined based on a result of the analysis. In other words, faces included in the frames are important areas for the user in many cases. Thus, an image low in shaking or blurring in its face area is set as an extraction target.

Further, a frame from which a face has successfully been detected can preferentially be regarded as a frame candidate to be extracted. In other words, since a frame including a face is regarded as an important frame for the user, the frame may be preferentially extracted. For example, when all the frames are evaluated, if there are two images where shaking or blurring of similar levels has been detected, a frame including a face area in the two images is set as an extraction target.

In addition, a frame to be extracted can be determined based on various image quality analysis results such as high color quality, appropriate contrast, and noise feelings relating to the image quality. Thus, various modified examples of the image quality evaluation method can be employed.

Figure 4:
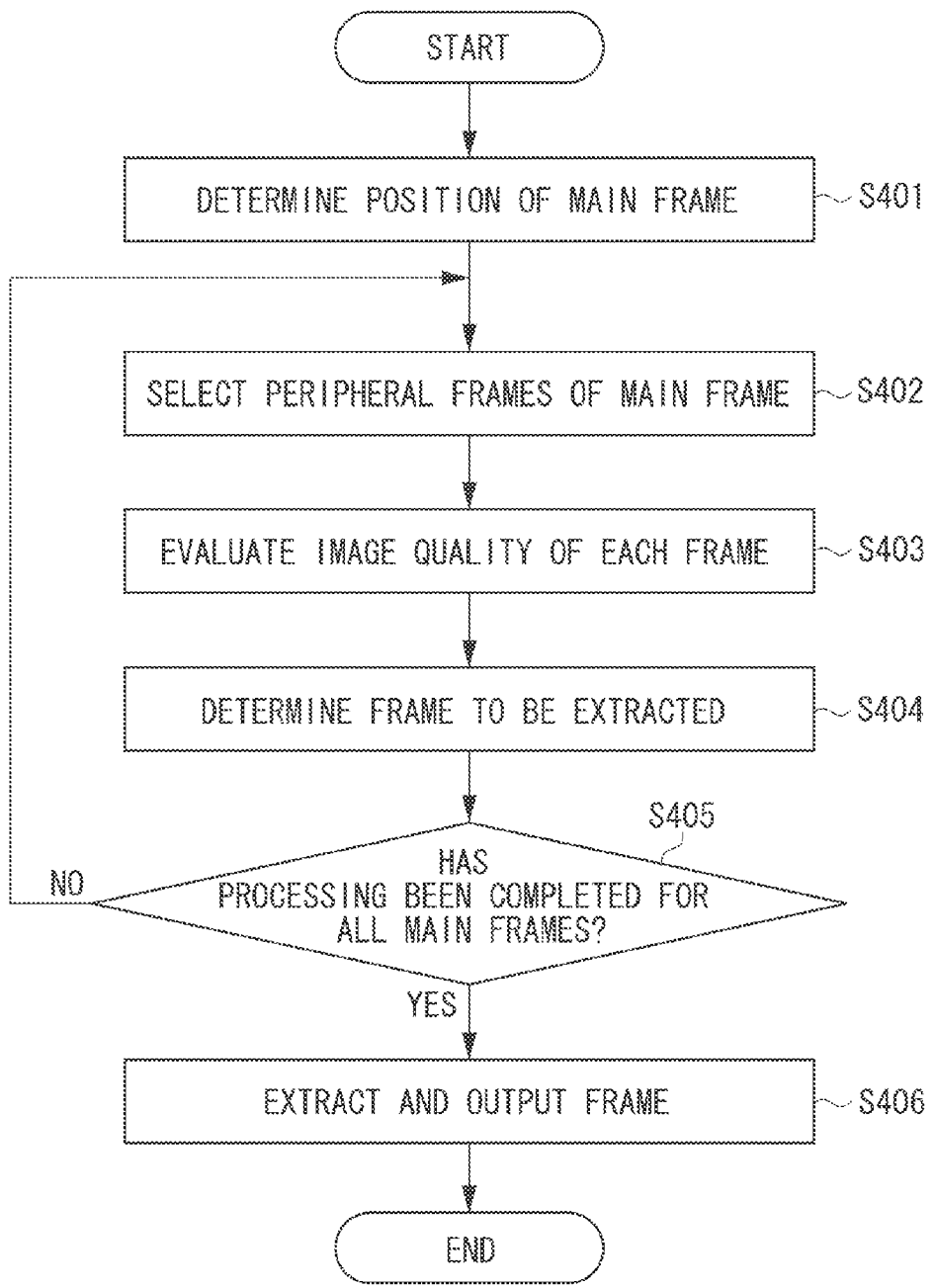
FIG. 4 is a flowchart illustrating frame extraction processing.

FIG. 4 is a flowchart illustrating frame extraction processing. A program corresponding to the processing illustrated in the flowchart of FIG. 4 is recorded in the ROM 103. The CPU 101 can achieve the processing illustrated in FIG. 4 by reading the program to the RAM 104 to execute it.

In FIG. 4, first, in step S401, the CPU 101 determines a predetermined number of main frames at predetermined frame intervals in an plurality of frames between the start position 201 and the end position 202 in the moving image designated by the user. The number of main frames and the frame intervals of the main frames can be determined by user's instruction as described above, or, for example, the predetermined number indicated by information stored in the ROM 103 can be set as the number of main frames or the frame interval.

In step S402, the CPU 101 selects, for the plurality of main frames thus determined, a plurality of frames around the main frames as peripheral frames.

For example, in the case of moving image data of 30 fps, the CPU 101 selects five frames before and after the main frame, totally ten frames, as peripheral frames. More specifically, the CPU 101 analyzes eleven frames including the main frame with respect to one main frame. The eleven frames correspond to a moving image of 0.36 seconds, and the number of frames corresponding to shaking of 0.3 seconds generated during the image-capturing can be analyzed.

However, when a leading frame or a last frame of moving image data is a main frame, peripheral frames before and after the main frame may not always be selected.

When the interval between the main frames is narrow, in the main frames adjacent to each other, two frame groups respectively including the main frame and peripheral frames corresponding to the main frame may overlap with each other or continue.

As a result of overlapping of the frame groups, output target frames may be extracted from the plurality of frame groups in an overlapped manner or in an order different from that in the frame groups. When the plurality of frame groups continue, in spite of user's designation of frame intervals made to prevent continuity in the moving image, two continuous frames in the moving image may be extracted.

Accordingly, the number and positions of peripheral frames can be determined according to the interval between the main frames. For example, the number of peripheral frames is determined so that at least one frame can be included between the peripheral frames corresponding to the plurality of main frames. Accordingly, the output target frame can be extracted from a frame group corresponding to the interval between the main frames.

Then, in step S403, the CPU 101 evaluates image qualities of the main frames and the peripheral frames targeted for blur detection. The CPU 101 evaluates the image quality of the frame by setting an analysis area for each frame and based on an analysis result for the analysis area.

Figure 5:
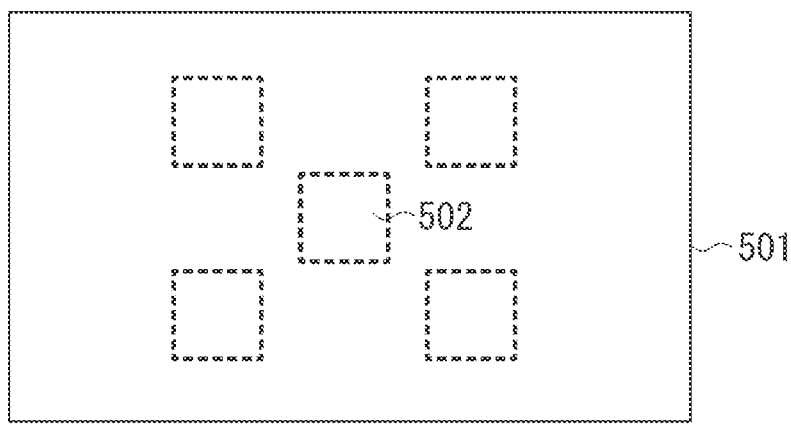
FIG. 5 illustrates an analysis area in a frame.

FIG. 5 illustrates an example of the analysis area in the frame. A predetermined area is set as an analysis area 502 for each frame 501 beforehand. The amount of shaking or blurring is estimated with respect to the analysis area. As a method for estimating the amount of shaking or blurring, a known technique can be employed. For example, an edge amount of the analysis area is calculated as an evaluation value of the amount of shaking or blurring.

In step S404, the CPU 101 determines one frame, which is estimated to be best in the image quality among the plurality of frames, as a extraction target frame based on the evaluation values of the plurality of frames as targets for image quality evaluation. In this case, the CPU 101 sets a plurality of analysis areas for each of the plurality of frames, and determines shaking or blurring in each analysis area. Then, the CPU 101 compares results of analysis in the plurality of analysis areas with one another between the frames to extract a frame low in shaking or blurring from among the plurality of frames.

According to the present exemplary embodiment, frames are extracted based on a "grading system" that evaluates image quality of a frame by giving a grade to each of the plurality of analysis areas. More specifically, when an evaluation value in analysis of an analysis area in a frame A is higher by a predetermined level or more than that in an analysis area in another frame B corresponding to the analysis area, a grade 3 is given to the analysis area in the frame A. On the other hand, no grade is given to the analysis area in the frame B (grade 0). Further, when there is no difference of the predetermined level or more between the analysis areas in the two frames (frame A and frame B), grades 1 are given to both analysis areas in the two frames.

A total of grades given to the plurality of analysis areas set in one frame (in the example illustrated in FIG. 5, total of grades of five analysis areas) is set as a grade of the frame. Then, a frame having the highest grade among the main frames and the peripheral frames is set as a frame to be extracted.

After the determination of the extraction target frame in step S404, in step S405, the CPU 101 determines whether processing has ended for all the main frames determined in step S401. When there are still main frames to be processed (NO in step S405), the processing returns to step S402 to repeat the frame extraction processing until completion of processing for all the main frames between the start position 201 and the end position 202.

When it is determined that the processing in steps S402 to S404 have ended for all the main frames between the start position 201 and the end position 202 (YES in step S405), the processing proceeds to step S406.

In step S406, the CPU 101 extracts the plurality of frames determined as the extraction targets in step S405 from the moving image data, and outputs the plurality of extracted frames.

According to the processing illustrated in FIG. 4, the frame groups including the plurality of main frames determined in step S401 and the peripheral frames selected for the respective main frames in step S402 are specified according to the frame intervals determined based on the user's instruction. In step S404, the CPU 101 extracts the output target frame from each frame group. As a result, the output target frames are extracted from the moving image at approximately fixed intervals.

In the above description, in order to prevent the overlap or continuity of the plurality of frame groups, the number of peripheral frames is designated so as to include at least one frame between the plurality of frame groups when the peripheral frames are selected in step S402. However, the present exemplary embodiment is not limited to this configuration. By setting a predetermined number of peripheral frames, the minimum number of frames between the main frames that can be designated by the user can be set to a number which can prevent the peripheral frames from overlapping or continuing with each other in the plurality of frame groups. In this case, at least one frame can be included between the plurality of frame groups regardless of an interval set between the main frames according to user's instruction.

In the output processing in step S406, for example, the display control unit 106 can display the plurality of frames extracted from the moving image data on the display device 107. Further, print data corresponding to the plurality of frames extracted from the moving image data can be output to the output device 110 serving as a printing apparatus, and an image corresponding to the plurality of frames can be printed on a printing medium.

The plurality of frames extracted from the moving image data can be individually displayed or printed. For example, the plurality of frames can be laid out side by side on a display screen or a printing medium. The plurality of frames can be superimposed one another to be composed and output as one image.

The number of analysis areas to be set in the frame to evaluate the image quality in step S403 is not limited to five areas in the present exemplary embodiment. Particularly, in the case of a moving image, an area of the end can be added in view of motion of the object. Further, a plurality of analysis areas can be set based on a range finding point of the camera.

When the image quality of the frame is evaluated by the plurality of analysis areas, weighting can be executed according to the analysis areas set in the frame. For example, the center can be set higher in weight than the periphery. For example, when the above-described "grading system" is used, a grade given to the analysis area of the center can be weighted greater than those given to the other analysis areas.

The number of peripheral frames for one main frame is not necessarily fixed, and can be determined according to the interval between the main frames. For example, more peripheral frames can be selected as the interval between the main frames is wider. Accordingly, the peripheral frames corresponding to the two main frames can be prevented from overlapping with one another, and many peripheral frames can be selected.

In the present exemplary embodiment, in step S405, the CPU 101 sequentially determines the extraction target frames for each main frame. However, the present exemplary embodiment is not limited to this configuration, and the processing can be executed for the extraction target frames in parallel with the plurality of main frames.

As illustrated in FIG. 4, the processing for extracting the frame low in shaking or blurring from the main frames or the peripheral frames can be executed when execution of the extraction processing is instructed by the user, in addition to when the instruction as to the frame interval is instructed by the user. In other words, as apparent from FIG. 3, in the present exemplary embodiment, an output target frame may be extracted from the peripheral frames. Then, even when the user assumes the interval between the main frames, there is a possibility that a frame at a position slightly shifted from the interval may be extracted. Thus, according to user's instruction, the extraction processing is executed after confirmation that the user permits such an extraction method.

On the other hand, when the user instructs the frame interval but not execution of the extraction processing, the CPU 101 extracts the plurality of main frames determined in step S401 as output target frames.

As described above, in step S401, the CPU 101 first determines the plurality of main frames in the moving image at the predetermined frame intervals, and then respectively determines the peripheral frames corresponding to the plurality of main frames.

Accordingly, when the frames are extracted from around a given main frame, the frames are extracted regardless of the positions of the frames extracted from around the main frames adjacent to each other in the sequence of the moving image. Such extraction may enlarge an error in the interval of the frames extracted from the moving image with respect to the main frame interval.

For example, it is presumed that a user designates 30 frames as a frame interval, and five frames around the main frame are selected as peripheral frames. In this case, for the main frame 301, the frame A to be extracted is determined among five frames before and after the main frame 301, and the frame B is extracted from five frames before and after the main frame 302 which is located 30 frames after the main frame 301. The number of frames between the frame A to be extracted and the frame B to be extracted is accordingly 20 to 40 frames.

Thus, even when the frame interval determined according to the user's instruction is originally 30 frames, the interval of the actually extracted frames is 20 to 40 frames, generating an error up to 10.

In this case, therefore, the position of the main frame is determined according to the position of the frame extracted corresponding to the other main frame. More specifically, concerning determination of a given main frame, a method for determining a next main frame based on a frame to be extracted corresponding to the preceding main frame is described.

FIG. 6 is a flowchart illustrating an operation of the frame extraction method of the present exemplary embodiment.

First, in step S601, the CPU 101 determines a leading main frame from the plurality of frames between the start position 201 and the end position 202 in the moving image. The leading main frame corresponds to, for example, the start position 201. A position of the leading frame can be determined according to the start position 201 and a range of selecting peripheral frames. For example, when the range of selecting peripheral frames is five frames before and after the main frame, then a fifth frame from the frame of the start position 201 can be set as a leading main frame. Accordingly, a leading frame to be extracted is determined among frames from the frame located at the start position 201 to eleventh frame.

Then, in step S602, the CPU 101 selects the peripheral frames corresponding to the main frame. In step S603, the CPU 101 evaluates the image qualities of the main frame and the peripheral frames. In step S604, the CPU 101 determines the extraction target frames based on the image quality evaluation. The processing in steps S602 to S604 is similar to that in steps S402 to S404 illustrated in FIG. 4.

In step S605, the CPU 101 determines whether there is a frame located ahead by a predetermined frame interval from the frames extracted in step S604. When there is still a frame after this (YES in step S605), the CPU 101 sets the frame as a main frame, and the processing proceeds to step S606. The processing in step S606 is described below.

When a main frame next to the frame is located beyond the end position 202 in the moving image in step S604, the CPU 101 determines that the processing in steps S602 to S604 has ended for all the frames between the start position 201 and the end position 202, and the processing proceeds to step S607. In step S607, as in the case of step S406, the CPU 101 executes output processing for the plurality of extraction target frames.

In step S606, the CPU 101 determines a position of the main frame next to the main frame based on the positions of the extraction target frames, which have been determined in step S604. More specifically, the CPU 101 sets a frame located by a frame interval determined by a user's instruction after the frame extracted in step S604 as a main frame. For example, when the user designates 30 frames as a frame interval, the CPU 101 sets a frame located by 30 frames after the frame extracted in step S604 as a new main frame.

Then, according to the position of the main frame determined in step S606, the CPU 101 selects peripheral frames corresponding to the main frame. For example, five frames before and after the main frame are selected as peripheral frames.

FIG. 7 illustrates main frame determination processing. It is presumed that a main frame 701 is determined in step S601 or S606 illustrated in FIG. 6 and a frame 702 to be extracted is determined as a frame to be extracted corresponding to the main frame 701 in step S604. Then, in step S606, a frame 703 located after 30 frames from the frame 702 to be extracted is determined as a new main frame.

Thus, according to the method described in the present exemplary embodiment, the position of the next main frame is determined based on the position of the frame extracted as a frame low in shaking or blurring. To describe main frame determination processing of the present exemplary embodiment, it is presumed that as in the case of the above-described example, the user designates 30 frames as a frame interval, and five frames around the main frame are selected as peripheral frames.

In this case, since the main frame 703 located after 30 frames from the frame 702 extracted in step S604 becomes a main frame, frames low in shaking or blurring are extracted from 25th to 35th frames from the extracted frame 702. Thus, an interval of a plurality of frames actually extracted from the moving image is 25 to 35 frames. In other words, an error can be limited to five frames at the maximum with respect to the frame interval (30 frames) determined according to a user's instruction. In the case of the above example, an error up to 10 frames is generated under the same condition. Thus, the processing according to the present exemplary embodiment can reduce the error.

Thus, according to the method described above, the position of the next main frame is determined based on the position of the frame extracted as a frame low in shaking or blurring. As a result, an error between the interval of the plurality of frames actually extracted from the moving image and the frame interval determined according to the user's instruction can be reduced.

According to the above-described exemplary embodiment, the frame low in shaking or blurring can be extracted by specifying the main frame according to the frame interval determined based on the user's instruction and analyzing the main frame and the peripheral frames of the main frame. Thus, appropriate frames can be extracted from the plurality of frames included in the moving image at the intervals according to the user's instruction.

Not limited to the extraction of frames from the moving image, the processing according to the above-described exemplary embodiment can be applied when still images are extracted from a plurality of still images at intervals according to a user's instruction. For example, the processing can be used for extracting images low in shaking or blurring at intervals specified by the user so that the user can instantaneously understand contents of a great volume of still images stored in the computer.

The image processing apparatus according to the exemplary embodiment includes the display device 107 and the output device 11. However, the image processing apparatus can be configured to display an image on an external display device connected to the image processing apparatus or to output an image to the external output device 110. Further, for the image processing apparatus, for example, various devices such as a personal computer (PC), an imaging apparatus such as a digital still camera or a digital video camera, a printing apparatus, and a mobile device such as a portable telephone can be used.

The present invention can also be achieved by a processing method that stores, in a recording medium, a program for operating the components of the above-described exemplary embodiment to achieve the functions of the exemplary embodiment, reads the program stored in the recording medium as a code, and executes the program by a computer is also within the exemplary embodiment.

The recording medium is a computer-readable recording medium. Further, not only the recording medium storing the program but also the program itself are included in the exemplary embodiment. As the recording medium, for example, a floppy disk, a hard disk, an optical disk, a magneto-optical disk, a compact disk (CD)-ROM, a magnetic tape, a nonvolatile memory card, or a ROM can be used.

Further, the present invention can be applied to not only an apparatus that can execute the processing by a single program stored in the recording medium, but also an apparatus operated on the OS to execute the operation of the exemplary embodiment in cooperation with functions of other software and an expansion board.

Further, not only a case of executing the exemplary embodiment by one processor but also cooperation with a plurality of processors can achieve the processing of the exemplary embodiment.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-161437 filed Jul. 23, 2011, which is hereby incorporated by reference herein in its entirety.

What is claimed is:

1. An image processing apparatus for extracting a frame to be output among a plurality of frames included in a moving image, the image processing apparatus comprising:
   a specification unit configured to specify, among the plurality of frames, a plurality of frame groups according to a predetermined frame interval;
   a comparison unit configured to analyze a plurality of first analysis areas in a first frame to obtain a first analysis result for each first analysis area and a plurality of second analysis areas in a second frame to obtain a second analysis result for each second analysis area, the first frame and second frame being in a frame group among the plurality of frame groups specified by the specification unit, wherein each of the first analysis areas corresponds to a corresponding second analysis area, and further configured to individually compare first analysis results and second analysis results of each corresponding first analysis area and second analysis area; and
   an extraction unit configured to extract a frame to be output from each of the plurality of frame groups based on a comparison result for each of the plurality of frame groups by the comparison unit.

2. The image processing apparatus according to claim 1, wherein the specification unit specifies a plurality of main frames from the moving image according to the predetermined frame interval and specifies a plurality of frame groups, each frame group of the plurality of frame groups including a different main frame among the specified plurality of main frames.

3. The image processing apparatus according to claim 2, wherein the specification unit specifies a plurality of peripheral frames within a predetermined number of frames from each of the plurality of main frames, and a main frame and peripheral frames specified for the main frame are included in a frame group.

4. The image processing apparatus according to claim 1, wherein the specification unit newly specifies, based on a first output target frame extracted from a first frame group by the extraction unit and the predetermined frame interval, a second frame group among the plurality of frames included in the moving image, and the extraction unit newly extracts a second output target frame from the newly specified second frame group.

5. The image processing apparatus according to claim 1, wherein the specification unit determines, based on the predetermined frame interval, the number of frames included in the frame group so that at least one frame is included between the plurality of frame groups in an array of the plurality of frames in the moving image, and specifies the plurality of frame groups among the plurality of frames according to the determined number of frames.

6. The image processing apparatus according to claim 1, further comprising an input unit configured to input an instruction by a user
   wherein the specification unit determines a frame interval according to the instruction input by the input unit as the predetermined frame interval and specifies the plurality of frame groups at intervals corresponding to the determined frame interval.

7. The image processing apparatus according to claim 6, wherein the input unit inputs a frame interval designated by a user, as the instruction.

8. The image processing apparatus according to claim 6, wherein the input unit inputs the number of output target frames to be extracted by the extraction unit, as the instruction.

9. The image processing apparatus according to claim 6, wherein the input unit inputs a time interval in the moving image designated by the user, as the instruction.

10. The image processing apparatus according to claim 1, further comprising an output control unit configured to output the frame extracted by the extraction unit.

11. The image processing apparatus according to claim 10, wherein the output control unit causes a printer to print an image corresponding to the frame extracted by the extraction unit.

12. The image processing apparatus according to claim 10, wherein the output control unit causes a display device to display an image corresponding to the frame extracted by the extraction unit.

13. A method of image processing for extracting a frame to be output among a plurality of frames included in a moving image, the method comprising:
   specifying, among the plurality of frames, a plurality of frame groups according to a predetermined frame interval;
   analyzing a plurality of first analysis areas in a first frame to obtain a first analysis result for each first analysis area and a plurality of second analysis areas in a second frame to obtain a second analysis result for each second analysis area, the first frame and second frame being in a frame group among the plurality of frame groups specified in the specification, wherein each of the first analysis areas corresponds to a corresponding second analysis area;
   individually comparing first analysis results and second analysis results of each corresponding first analysis area and second analysis area; and
   extracting a frame to be output from each of the plurality of frame groups based on a comparison result for each of the plurality of frame groups in the comparison.

14. The method of image processing according to claim 13, wherein, in the specification, a plurality of main frames are specified from the moving image according to the predetermined frame interval and a plurality of frame groups are specified, each frame group of the plurality of frame groups including a different main frame among the specified plurality of main frames.

15. The method of image processing according to claim 14, wherein, in the specification, a plurality of peripheral frames within a predetermined number of frames are specified from each of the plurality of main frames, and a main frame and peripheral frames specified for the main frame are included in a frame group.

16. The method of image processing according to claim 13, wherein, in the specification, based on a first output target frame extracted from a first frame group in the extraction and the predetermined frame interval, a second frame group among the plurality of frames included in the moving image is newly specified, and a second output target frame is newly extracted from the newly specified second frame group.

17. The method of image processing according to claim 13, wherein, in the specification, based on the predetermined frame interval, the number of frames included in the frame group are determined so that at least one frame is included between the plurality of frame groups in an array of the plurality of frames in the moving image, and the plurality of frame groups among the plurality of frames are specified according to the determined number of frames.

18. The method of image processing according to claim 13, further comprising inputting an instruction by a user,
wherein, in the specification, a frame interval is determined according to the instruction input in the inputting as the predetermined frame interval and the plurality of frame groups are specified at intervals corresponding to the determined frame interval.

19. The method of image processing according to claim 18, wherein, in the inputting, a frame interval designated by a user is input, as the instruction.

20. The method of image processing according to claim 19, wherein, in the inputting, the number of output target frames to be extracted in the extraction is input, as the instruction.

21. The method of image processing according to claim 19, wherein, in the inputting, a time interval in the moving image designated by the user is input, as the instruction.

22. The method of image processing according to claim 13, further comprising outputting the frame extracted in the extraction.

23. The method of image processing according to claim 22, wherein, in the outputting, an image corresponding to the frame extracted in the extraction is printed by a printer.

24. The method of image processing according to claim 22, wherein, in the outputting, an image corresponding to the frame extracted in the extraction is displayed by a display device.

25. A non-transitory computer readable storage medium for storing a program causing a computer to execute a method of image processing for extracting a frame to be output among a plurality of frames included in a moving image, the method comprising:
specifying, among the plurality of frames, a plurality of frame groups, according to a predetermined frame interval;
analyzing a plurality of first analysis areas in a first frame to obtain a first analysis result for each first analysis area and a plurality of second analysis areas in a second frame to obtain a second analysis result for each second analysis area, the first frame and second frame being in a frame group among the plurality of frame groups specified in the specification, wherein each of the first analysis areas corresponds to a corresponding second analysis area;
individually comparing first analysis results and second analysis results of each corresponding first analysis area and second analysis area; and
extracting a frame to be output from each of the plurality of frame groups based on a comparison result for each of the plurality of frame groups in the comparison.

* * * * *